W. C. McCLINTOCK.
ROD-COUPLING.

No. 189,120. Patented April 3, 1877.

WITNESSES:
J. H. Scarborough
A. F. Terry

INVENTOR:
W. C. McClintock
BY
Munn
ATTORNEYS.

UNITED STATES PATENT OFFICE.

WILLIAM C. McCLINTOCK, OF HOOPERSTON, ILL., ASSIGNOR TO HIMSELF AND WILLIAM B. STEELE, OF BERNHART'S MILLS, PA.

IMPROVEMENT IN ROD-COUPLINGS.

Specification forming part of Letters Patent No. 189,120, dated April 3, 1877; application filed March 3, 1877.

*To all whom it may concern:*

Figure 1:
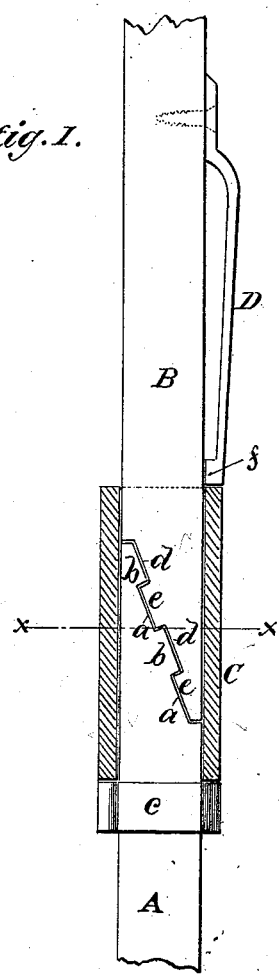
Figure 2:
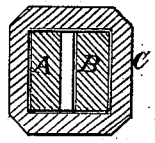

Be it known that I, WILLIAM C. MCCLINTOCK, of Hooperston, in the county of Vermillion and State of Illinois, have invented a new and Improved Rod-Coupling, of which the following is a specification:

Figure 1 is a side elevation, with a part removed to show internal parts. Fig. 2 is a transverse section on line $xx$ in Fig. 1.

Similar letters of reference indicate corresponding parts.

My invention consists in a rod or shaft having scarfed ends, upon which are formed alternate transverse recesses and projections, which are so proportioned that the projections of one section of shaft fit the recesses in the adjacent section. The adjoining ends of the sections are held together by a sliding sleeve, which is retained in place by a spring-latch.

In the drawing, A is the end of a section of a rod or shaft, which is scarfed and provided with transverse recesses $a$ and projections $b$. It is also provided with a collar, $c$. B is a section of a rod or shaft that is scarfed and provided with recesses $d$ and projections $e$, corresponding to the recesses and projections of the section A. The projections $b$ of the section A fit into the recesses $d$ of the section B, and the projections $e$ of the section B fit into the recesses $a$ of the section A. C is a sleeve that fits over the section B, and is capable of sliding over the joint of the sections A B. A spring-latch, D, is attached to the section B, and is capable of holding the sleeve against the collar $c$, as shown in Fig. 1, or of holding it above the scarf of the section B by the engagement of the lug $f$, formed on its lower end, with the lower end of the sleeve.

My improved coupling is applicable to pump-sucker rods, and to shafts, and may be used for coupling rods for various purposes.

A rod or shaft having my improvement may be quickly coupled or uncoupled without wrenches or appliances of any sort.

Having thus described my invention, I claim as new and desire to secure by Letters Patent—

The sections A B, scarfed at their inner ends, and provided with transverse recesses and projections, the section A having the collar $c$, the sleeve C, and spring-latch D, in combination substantially as herein shown and described.

WILLIAM CULBERSON McCLINTOCK.

Witnesses:
 FRANK MCCLINTOCK,
 F. M. SMALL.